US012658548B2

(12) United States Patent
Wang et al.

(10) Patent No.: US 12,658,548 B2
(45) Date of Patent: Jun. 16, 2026

(54) TRANSMISSION LINE CONNECTION STRUCTURE

(71) Applicant: HUAWEI TECHNOLOGIES CO., LTD., Shenzhen (CN)

(72) Inventors: Shang Wang, Shenzhen (CN); Xinming Liu, Xi'an (CN); Li Jin, Xi'an (CN); Qiqiang Gao, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 59 days.

(21) Appl. No.: 18/672,016

(22) Filed: May 23, 2024

(65) Prior Publication Data

US 2024/0313382 A1 Sep. 19, 2024

Related U.S. Application Data

(63) Continuation of application No. PCT/CN2022/137425, filed on Dec. 8, 2022.

(30) Foreign Application Priority Data

Dec. 15, 2021 (CN) ........................ 202111538192.8

(51) Int. Cl.
*H01P 3/08* (2006.01)
*H01P 5/02* (2006.01)

(52) U.S. Cl.
CPC . *H01P 3/08* (2013.01); *H01P 5/02* (2013.01)

(58) Field of Classification Search
CPC .................................... H01P 3/08; H01P 5/02
See application file for complete search history.

(56) References Cited

U.S. PATENT DOCUMENTS

| | | | | |
|---|---|---|---|---|
| 4,862,120 | A | 8/1989 | Ruxton et al. | |
| 6,133,880 | A | 10/2000 | Grangeat et al. | |
| 2002/0190913 | A1 | 12/2002 | Kuck | |
| 2005/0098348 | A1* | 5/2005 | Okumichi | H01L 23/66 174/262 |
| 2013/0256849 | A1* | 10/2013 | Danny | H01P 5/107 257/664 |

FOREIGN PATENT DOCUMENTS

| | | | |
|---|---|---|---|
| EP | 3249741 | B1 | 11/2017 |

* cited by examiner

*Primary Examiner* — Samuel S Outten

(57) ABSTRACT

This disclosure provides a transmission line connection structure including a first transmission line, a second transmission line, and a coupling connection structure. The first transmission line corresponds to a first ground layer and a conductor strip. The second transmission line corresponds to the conductor strip and a second ground layer. The first ground layer and the second ground layer are discontinuous. The coupling connection structure includes a first coupling section (101), a second coupling section (102), and a third coupling section (103). A conductor part of the first coupling section (101) and a conductor part of the third coupling section (103) are respectively coupled to the first ground layer and the second ground layer. The second coupling section is connected to the first coupling section and the third coupling section. The coupling connection structure is configured to be coupled to the first ground layer and the second ground layer.

10 Claims, 9 Drawing Sheets

TRANSMISSION LINE CONNECTION STRUCTURE

CROSS-REFERENCE TO RELATED APPLICATIONS

This application is a continuation of International Patent Application No. PCT/CN2022/137425, filed on Dec. 8, 2022, which claims priority to Chinese Patent Application No. 202111538192.8, filed on Dec. 15, 2021. The disclosures of the aforementioned applications are hereby incorporated by reference in their entireties.

TECHNICAL FIELD

Embodiments of this application relate to the antenna field, and in particular, to a transmission line connection structure.

BACKGROUND

An antenna feed network of a base station includes transmission lines in different forms, and a transfer location exists between the different transmission lines. Due to field discontinuity, a severe loss occurs on the transfer location between the different transmission lines in a signal transmission process. This severely affects antenna system efficiency, a pattern gain, and the like. For example, in a feed network, a transfer location between a microstrip and a stripline causes a severe loss, and even excites a parasitic resonance mode. This severely affects signal transmission.

In a conventional solution, a ground rod structure is added at a transfer location, and impact of field transfer discontinuity is reduced by using a ground screw or a metalized via, so that a transmission loss is reduced. However, this manner usually affects transmission line matching, increases a standing wave ratio, and use of the screw may cause a passive intermodulation risk. Therefore, how to better reduce impact caused by field discontinuity and obtain a better transfer apparatus to transit transmission lines in different forms becomes an urgent problem to be resolved.

SUMMARY

Embodiments of this disclosure provide a transmission line connection structure. At a transfer location between two transmission lines, discontinuous ground layers are connected by using a coupling connection structure, to reduce a transmission loss caused by field discontinuity.

A first aspect of embodiments of this disclosure provides a transmission line connection structure. The transmission line connection structure includes as follows.

The transmission line connection structure includes a first transmission line, a second transmission line, and a coupling connection structure. The first transmission line includes a conductor strip and a first ground layer, and the second transmission line includes the conductor strip and a second ground layer. Because the first ground layer and the second ground layer are discontinuous, a large loss usually occurs on a transfer location between a first transmission line and a second transmission line. The coupling connection structure is located near the conductor strip at the transfer location, and is configured to be coupled to the first ground layer and the second ground layer, to reduce impact caused by field discontinuity. The coupling connection structure includes a first coupling section 101, a second coupling section 102, and a third coupling section 103. A conductor part of the first coupling section 101 is coupled to the first ground layer, a conductor part of the third coupling section 103 is coupled to the second ground layer, and the second coupling section 102 is connected to the first coupling section 101 and the third coupling section 103.

In the foregoing transmission line connection structure, the coupling connection structure is used as a transition structure near the transfer location between the first transmission line and the second transmission line, so that a loss caused by the field discontinuity can be greatly reduced, a parasitic resonance mode in an operating frequency band can be fully suppressed, and a transmission loss can be reduced. In addition, in a coupling connection manner of the coupling connection structure, a location of the coupling connection structure may be more flexibly adjusted, so that transmission line impedance matching is properly controlled. In addition, a passive intermodulation risk can be avoided by using the coupling connection structure. Therefore, the transmission line connection structure has better performance, and transmission efficiency can be improved when signal transmission is performed between different transmission lines.

In an optional implementation, the first coupling section 101 and the third coupling section 103 in the coupling connection structure are on different horizontal planes, and the first coupling section 101 is parallel to the third coupling section 103. The second coupling section 102 is perpendicular to the first coupling section 101 and the third coupling section 103. Because the second coupling section 102 is perpendicular to the first coupling section 101 and the third coupling section 103, a volume of the coupling connection structure 401 is small. This is more conducive to arrangement of the coupling connection structure 401 at a transfer location between different transmission lines.

In an optional implementation, the first coupling section 101 and the third coupling section 103 in the coupling connection structure are on different horizontal planes, and the first coupling section 101 is parallel to the third coupling section 103. However, the second coupling section 102 is tilted relative to the first coupling section 101, and a tilt angle is formed between the second coupling section 102 and the first ground layer. In this way, the location of the coupling connection structure may be adjusted to control the transmission line impedance matching, and tilt of the coupling transition structure may be adjusted to control the transmission line impedance matching. For example, the tilt angle of the coupling transition structure decreases, so that a field change becomes smoother. This can further reduce the loss. In addition, impact on the impedance matching is also reduced, and a voltage standing wave ratio decreases constantly.

In an optional implementation, the conductor strip may have a coupling connection structure on one side, or may have a coupling connection structure on each of two sides. In other words, the transmission line connection structure may include a first coupling connection structure and a second coupling connection structure. The first coupling connection structure is located on a first side of the conductor strip, and the second coupling connection structure is located on a second side of the conductor strip. For example, the first coupling connection structure and the second coupling connection structure may be symmetrically distributed on both sides of the conductor strip, to further reduce the loss caused by the field discontinuity.

In an optional implementation, a plurality of coupling connection structures on both sides of the conductor strip may share a part of the coupling sections. For example, the first coupling connection structure and the second coupling connection structure may share the third coupling section 103 coupled to the second ground layer. In this way, the first coupling connection structure and the second coupling connection structure may bypass the conductor strip and are bridged between the first ground layer and the second ground layer by.

In an optional implementation, there are a plurality of sections of a conductor strip at a transfer location, and the coupling connection structure may be a multi-coupling connection structure. For example, two adjacent sections of the conductor strip are used as an example. The coupling connection structure may include a third coupling connection structure, a fourth coupling connection structure, a fifth coupling connection structure, and a sixth coupling connection structure. The third coupling connection structure is located on a first side of a first section of the conductor strip, the fourth coupling connection structure is located on a second side of the first section of the conductor strip, the fifth coupling connection structure is located on a first side of a second section of the conductor strip, and the sixth coupling connection structure is located on a second side of the second section of the conductor strip. Each section of the conductor strip has a coupling connection structure on each of two sides, to reduce a loss.

In an optional implementation, the third coupling connection structure and the fourth coupling connection structure may share the third coupling section 103 coupled to the second ground layer, the fourth coupling connection structure and the fifth coupling connection structure may share the first coupling section 101 coupled to the first ground layer, and the fifth coupling connection structure and the sixth coupling connection structure may share the third coupling section 103 coupled to the second ground layer. In this way, the multi-coupling connection structure forms a whole, to jointly reduce the loss caused by the field discontinuity.

In an optional implementation, the coupling connection structure includes the conductor part and an insulation part.

In an optional implementation, the insulation medium part exists between the first coupling section 101 and the first ground layer, and the insulation medium part exists between the third coupling section 103 and the second ground layer. The second coupling section 102 may have an insulation medium part, or may not have an insulation medium part. This is not specifically limited.

A second aspect of embodiments of this disclosure provides another transmission line connection structure. The transmission line connection structure includes as follows.

The transmission line connection structure includes a first transmission line, a second transmission line, a third transmission line, a fourth transmission line, and a coupling connection structure. The transmission line connection structure includes two conductor strips. A first conductor strip and a first ground layer correspond to the first transmission line. The first conductor strip and a second ground layer correspond to the second transmission line. A second conductor strip and the first ground layer correspond to the third transmission line. The second conductor strip and a third ground layer correspond to the fourth transmission line. The first ground layer, the second ground layer, and the third ground layer are all discontinuous. The coupling connection structure is configured to be bridged between the first ground layer, the second ground layer, and the third ground layer, and includes a first coupling section 101, a second coupling section 102, a third coupling section 103, a fourth coupling section 104, and a fifth coupling section 105. A conductor part of the first coupling section 101 is coupled to the first ground layer, a conductor part of the third coupling section 103 is coupled to the second ground layer, and the second coupling section 102 is connected to the first coupling section 101 and the third coupling section 103. A conductor part of the fifth coupling section 105 is coupled to the third ground layer, and the fourth coupling section 104 is connected to the first coupling section 101 and the fifth coupling section 105. The coupling connection structure is configured to be coupled to the first ground layer and the second ground layer, and be coupled to the first ground layer and the third ground layer.

In the foregoing transmission line connection structure, the coupling connection structure is used, to reduce impact of field transfer discontinuity and ground layer discontinuity, and greatly reduce a loss. In addition, in a connection manner of the coupling connection structure, a location of the coupling connection structure may be more flexibly adjusted, so that transmission line impedance matching is properly controlled. In addition, a passive intermodulation risk can be avoided by using the coupling connection structure and isolation between two lines can be improved. Therefore, the transmission line connection structure has better performance, and transmission efficiency is further improved when signal transmission is performed between different transmission lines.

In an optional implementation, the coupling connection structure includes the conductor part and an insulation part.

In an optional implementation, the insulation medium part exists between the first coupling section 101 and the first ground layer, the insulation medium part exists between the third coupling section 103 and the second ground layer, and the insulation medium part exists between the fifth coupling section 105 and the third ground layer. The second coupling section 102 and the fourth coupling section 104 may have insulation medium parts, or may not have insulation medium parts. This is not specifically limited.

DESCRIPTION OF EMBODIMENTS

Embodiments of this disclosure provide a transmission line connection structure. At a transfer location between two transmission lines, discontinuous ground layers are connected by using a coupling connection structure, to reduce a transmission loss caused by field discontinuity.

Technical terms used in embodiments of this disclosure are only used to describe specific embodiments but are not intended to limit this disclosure. In this specification, singular forms "one", "this", and "the" are used to include plural forms at the same time, unless otherwise stated in the context. Further, the "including" and/or "comprising" used in the specification refers to the presence of the feature, entirety, step, operation, element and/or component, but does not rule out the presence or adding of one or more other features, entireties, steps, operations, elements and/or components.

Figure 1:
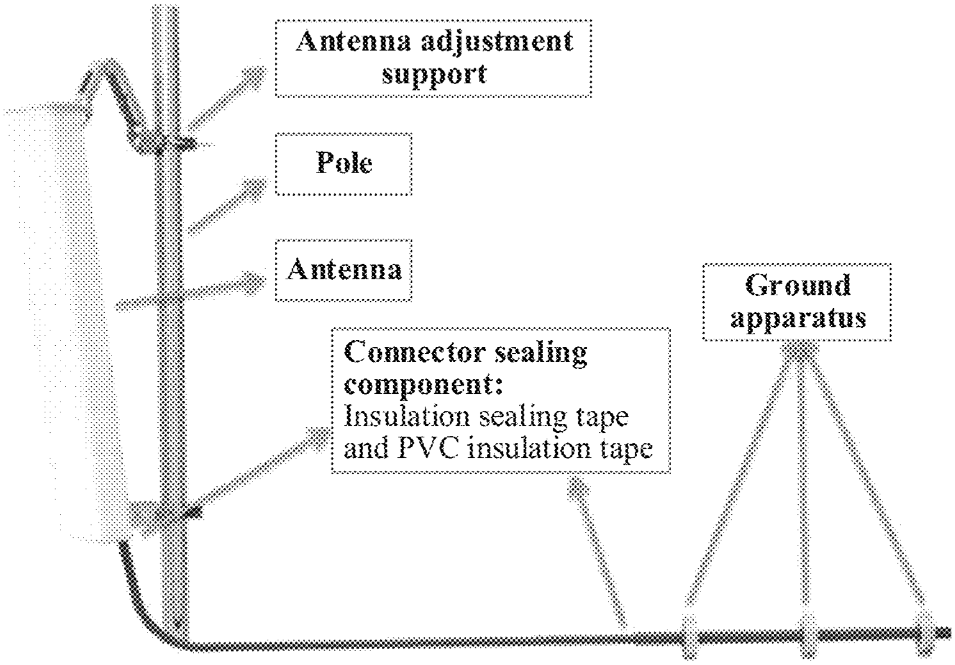
FIG. 1 is a diagram of a structure of a base station antenna feeder system according to an embodiment of this disclosure.
Figure 2:
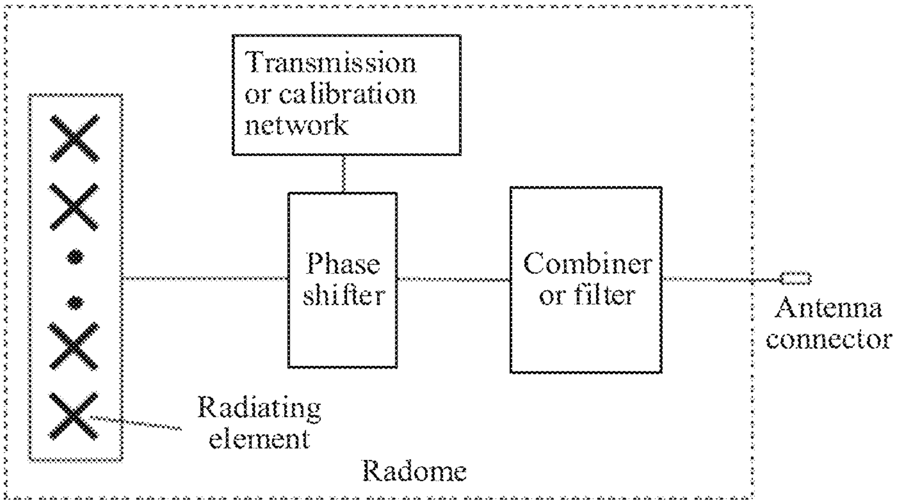
FIG. 2 is a diagram of a structure of a base station antenna according to an embodiment of this disclosure.

Embodiments of this disclosure are applied to a base station antenna feeder system. FIG. 1 is a diagram of a structure of a base station antenna feeder system according to an embodiment of this disclosure. As shown in FIG. 1, the base station antenna feeder system includes a base station antenna, a pole, an antenna adjustment support, a ground apparatus, and the like. A diagram of a structure of the base station antenna is shown in FIG. 2. The base station antenna includes radiating elements, a metal reflection plate, a transmission or calibration network, a feed network, a radome, and the like. The radiating element is also referred to as an antenna element, and forms a basic structure in an antenna array together with the metal reflection plate. The radiating element is usually placed above the metal reflection plate, and can effectively radiate or receive a radio wave. The metal reflection plate is also referred to as an antenna panel, a metal reflection surface, or the like. The metal reflection plate is configured to reflect and aggregate an external antenna signal at a receiving point, to improve receiving sensitivity of the antenna signal. This not only can greatly enhance a signal receiving or transmitting capability of the antenna, but also can block or shield interference caused by other radio waves from a back (a reverse direction) to the received signal. The radome is a structure that protects an antenna system from an external environment. The radome not only has a good electromagnetic wave penetration characteristic in terms of electrical performance, but also has good mechanical performance that enables the base station antenna to withstand the external harsh environment.

The feed network feeds a sent downlink signal to the radiating element based on a specific amplitude and phase, or send a received uplink signal to a signal processing unit of a base station based on a specific amplitude and phase. The antenna array receives or transmits a radio frequency signal by using the feed network. The feed network may implement different radiation beam directions by using a transmission component, or may be connected to the calibration network to obtain a calibration signal needed by the system. Generally, the feed network includes a controlled impedance transmission line, and includes a phase shifter, a combiner, a filter, and other components.

Figure 3A:
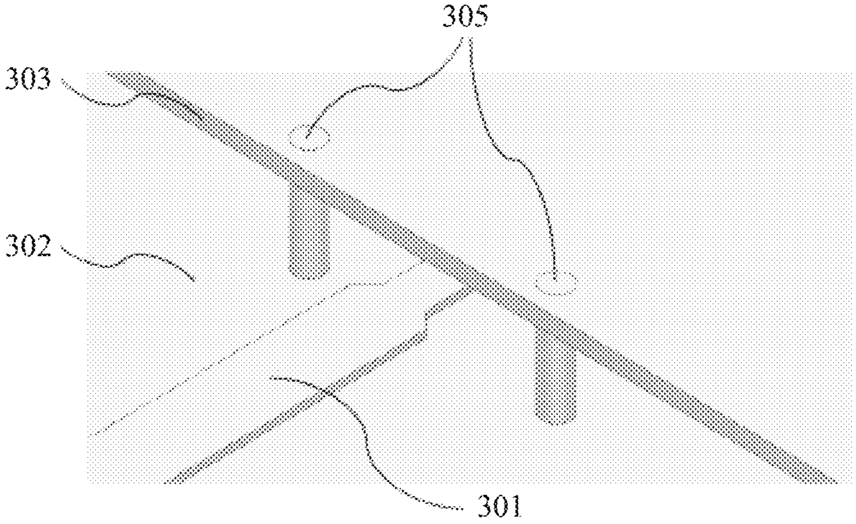
FIG. 3A is a diagram of a structure of a transmission line connection structure according to an embodiment of this disclosure.
Figure 3B:
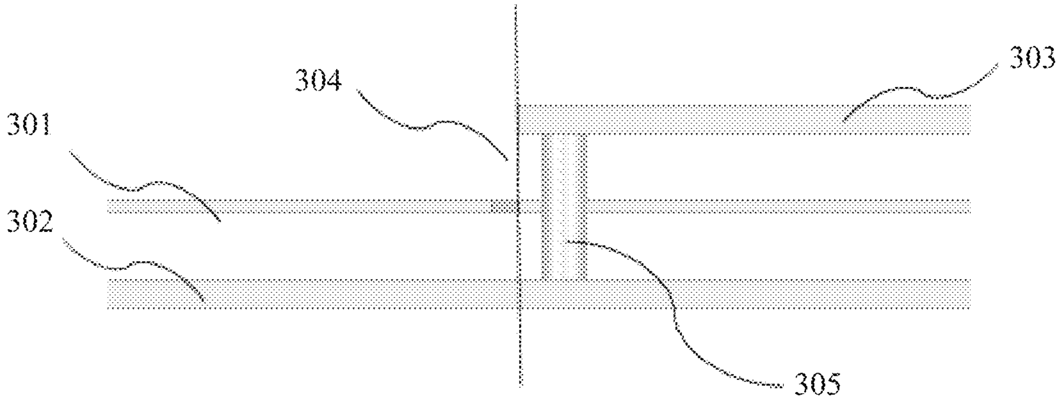
FIG. 3B is a side view of a transmission line connection structure according to an embodiment of this disclosure.

This embodiment of this disclosure relates to a feed network part. The feed network includes transmission lines in different forms. Ground layers corresponding to the transmission lines in different forms are discontinuous. Ground layer discontinuity causes field discontinuity. Due to the field discontinuity, a transfer between the transmission lines causes an extra loss. This affects transmission efficiency, a gain, and the like of the antenna system. FIG. 3A is a diagram of a structure of a transmission line connection structure according to an embodiment of this disclosure. As shown in FIG. 3A, in a first part, a conductor strip 301 and a first ground layer 302 form a first transmission line (a microstrip structure). In a second part, the conductor strip 301, the first ground layer 302, and the second ground layer 303 jointly form a second transmission line (a stripline structure). Because the first ground layer 302 and the second ground layer 303 are discontinuous, a transfer location exists between the first transmission line and the second transmission line. FIG. 3B is a side view of the transmission line connection structure shown in FIG. 3A. As shown in FIG. 3B, 304 is the transfer location between the first transmission line and the second transmission line. In a feed network, because the first ground layer 302 and the second ground layer 303 are discontinuous at the transfer location between a microstrip and a stripline, field discontinuity is caused. Consequently, a transmission loss is increased, and even a parasitic resonance mode is excited. This severely affects signal transmission in the conductor strip 301.

To reduce the transmission loss, in a conventional technical solution, ground rods 305 are added near the transfer location 304 between the two transmission lines to perform transition, so that impact caused by field transfer discontinuity is reduced and a network loss is reduced. The ground rods 305 are generally ground screws, are located on two sides of the conductor strip 301 near the transfer location 304 between the microstrip and the stripline, and has a distance from the conductor strip 301. However, adding the ground screws may affect transmission line impedance matching, and sizes and locations of the ground screws are not flexibly adjusted, so that a standing wave ratio of the transmission line may be deteriorated. In addition, use of a form of screw ground rod may cause a passive intermodulation risk. Therefore, how to obtain a better transfer apparatus to transit transmission lines in different forms becomes an urgent problem to be resolved.

Based on the foregoing problem, embodiments of this disclosure provide a transmission line connection structure. At a transfer location between two transmission lines, discontinuous ground layers are connected by using a coupling connection structure. This reduces a transmission loss, improves adjustment flexibility of the coupling connection structure, and can further avoid a passive intermodulation problem.

Figure 4A:
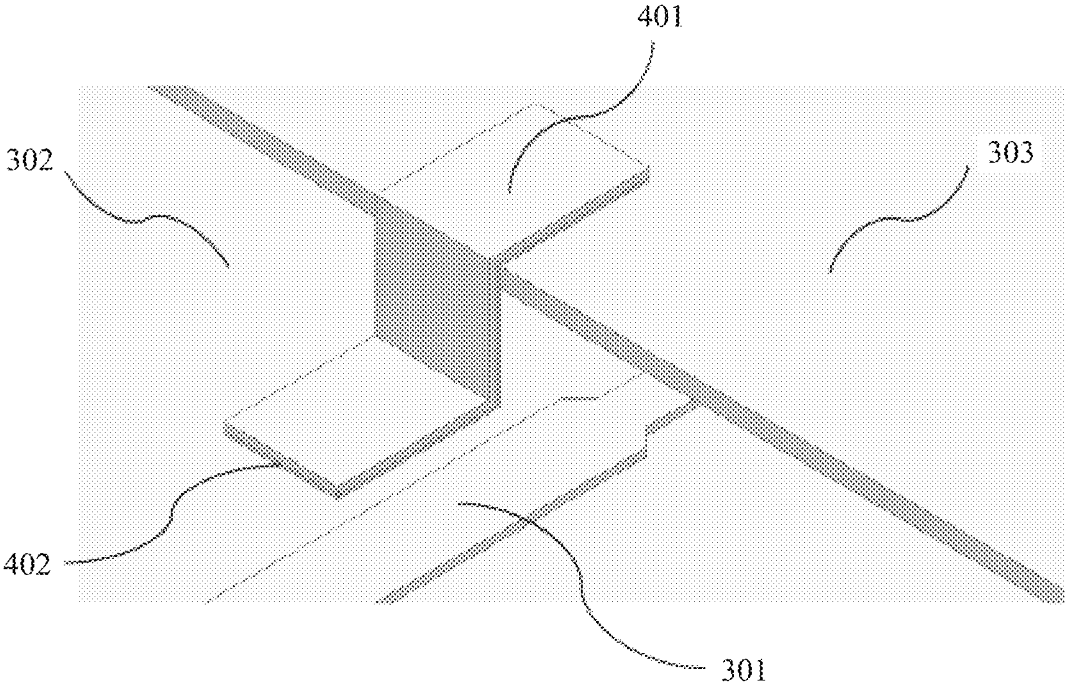
FIG. 4A is a diagram of a structure of a transmission line connection structure according to an embodiment of this disclosure.

(1) FIG. 4A is a diagram of a structure of a transmission line connection structure according to an embodiment of this disclosure. As shown in FIG. 4A, a coupling connection structure 401 is bridged between a first ground layer 302 and a second ground layer 303. A part of a conductor strip 301 and the first ground layer 302 form a microstrip structure, to form a first transmission line. Behind a transfer location, the conductor strip 301 is located between the first ground layer 302 and the second ground layer 303, and forms a stripline structure with the first ground layer 302 and the second ground layer 303, to form a second transmission line. A part of the coupling connection structure 401 is coupled to the first ground layer 302, and another part is coupled to the second ground layer 303. The coupling connection structure 401 is located on one side of the conductor strip 301. An insulation medium 402 exists between the coupling connection structure 401 and each of the first ground layer 302 and the second ground layer 303.

Figure 4B:
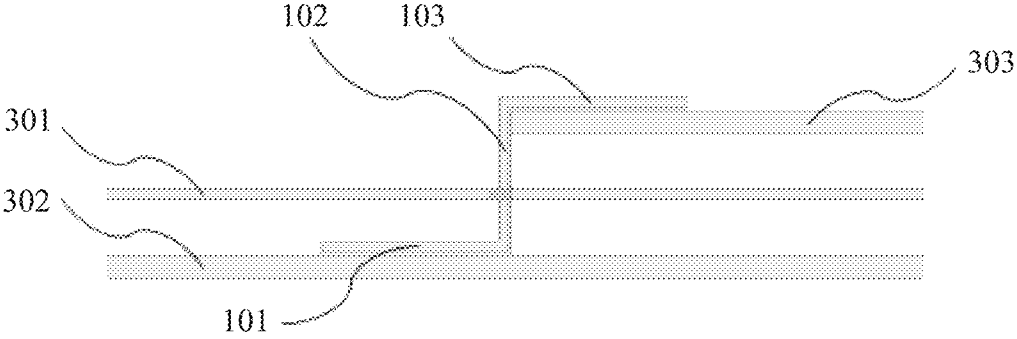
FIG. 4B is a side view of a transmission line connection structure according to an embodiment of this disclosure.

FIG. 4B is a side view of the transmission line connection structure shown in FIG. 4A. As shown in FIG. 4B, the coupling connection structure 401 is divided into three parts, including a first coupling section 101, a second coupling section 102, and a third coupling section 103. A conductor part of the first coupling section 101 is coupled to the first ground layer 302, a conductor part of the third coupling section 103 is coupled to the second ground layer 303, and the second coupling section 102 is connected to the first coupling section 101 and the third coupling section 103. For example, a plane on which the first coupling section 101 is located is parallel to a plane on which the third coupling section 103 is located, and a plane on which the second coupling section 102 is located is perpendicular to both the plane on which the first coupling section 101 is located and the plane on which the third coupling section 103 is located. It may be understood that, the plane on which the first coupling section 101 is located may not be absolutely parallel to the plane on which the third coupling section 103 is located, and a proper tilt angle also falls within the protection scope of this embodiment of this disclosure. This is not specifically limited.

In the foregoing transmission line connection structure, the coupling connection structure 401 is used as a transition structure near the transfer location between a microstrip and a stripline, so that a loss caused by field discontinuity can be greatly reduced, a parasitic resonance mode in an operating frequency band can be fully suppressed, and a transmission loss can be reduced. In addition, in a coupling connection manner of the coupling connection structure 401, a location of the coupling connection structure 401 may be more flexibly adjusted, so that transmission line impedance matching is properly controlled. In addition, a passive intermodulation risk can be avoided by using the coupling connection structure. Therefore, the transmission line connection structure has better performance, and transmission efficiency can be further improved when signal transmission is performed between different transmission lines. In addition, in the coupling connection structure 401, because the second coupling section 102 is perpendicular to the first coupling section 101 and the third coupling section 103, a volume of the coupling connection structure 401 is small. This is more conducive to arrangement of the coupling connection structure 401 at a transfer location between different transmission lines.

Figure 5A:
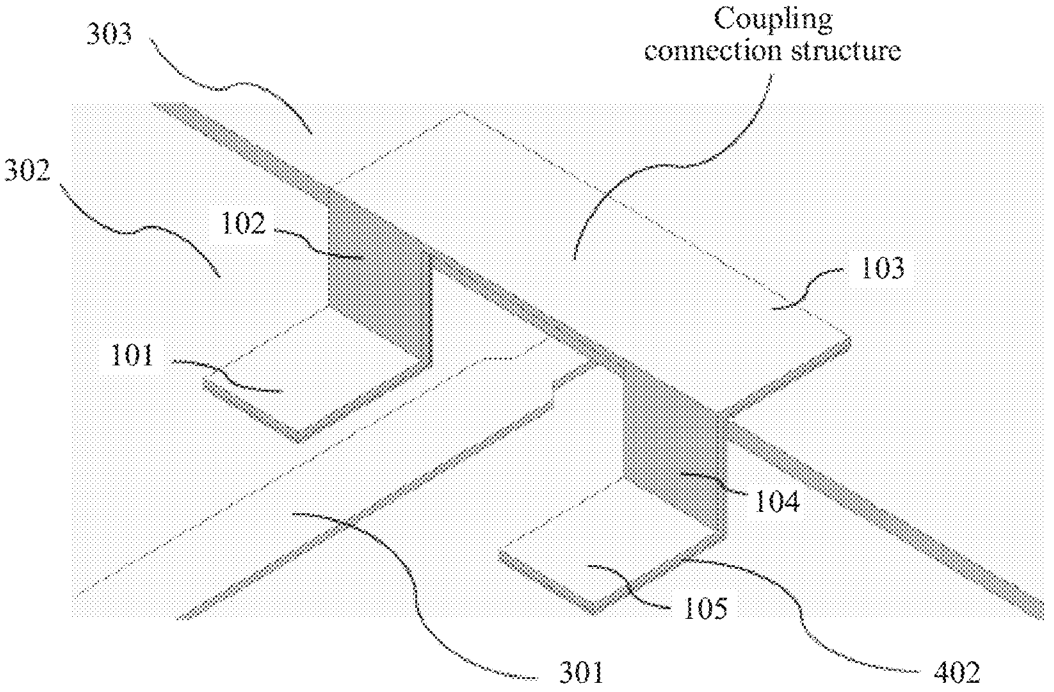
FIG. 5A is a diagram of a structure of another transmission line connection structure according to an embodiment of this disclosure.

(2) Based on the foregoing descriptions, the coupling connection structure 401 may be distributed on one side of the conductor strip 301, or may be distributed on each of two sides of the conductor strip 301. For example, distribution locations of the coupling connection structures 401 on the two sides of the conductor strip 301 are symmetrical. This further reduces impact caused by the field discontinuity, and improves the signal transmission efficiency. When the coupling connection structures 401 are distributed on the two sides of the conductor strip 301, a plurality of coupling connection structures 401 on the two sides may share a part of the coupling sections. FIG. 5A is a diagram of a structure of another transmission line connection structure according to an embodiment of this disclosure. A conductor strip 301 has a coupling connection structure on each of two sides, and two coupling connection structures may share a third coupling section 103, so that the coupling connection structure bypasses the conductor strip 301 and is bridged between a first ground layer 302 and a second ground layer 303.

A part of the conductor strip 301 and the first ground layer 302 form a microstrip structure, to form a first transmission line. Behind a transfer location, the conductor strip 301 is located between the first ground layer 302 and the second ground layer 303, and forms a stripline structure with the first ground layer 302 and the second ground layer 303, to form a second transmission line. A part of the coupling connection structure is coupled to the first ground layer 302, and another part is coupled to the second ground layer 303. An insulation medium 402 exists between the coupling connection structure and each of the first ground layer 302 and the second ground layer 303. The coupling connection structure includes a first coupling connection structure and a second coupling connection structure. The first coupling connection structure includes a first coupling section 101, a second coupling section 102, and the third coupling section 103. The second coupling connection structure includes a fourth coupling section 104, a fifth coupling section 105, and the third coupling section 103.

Figure 5B:
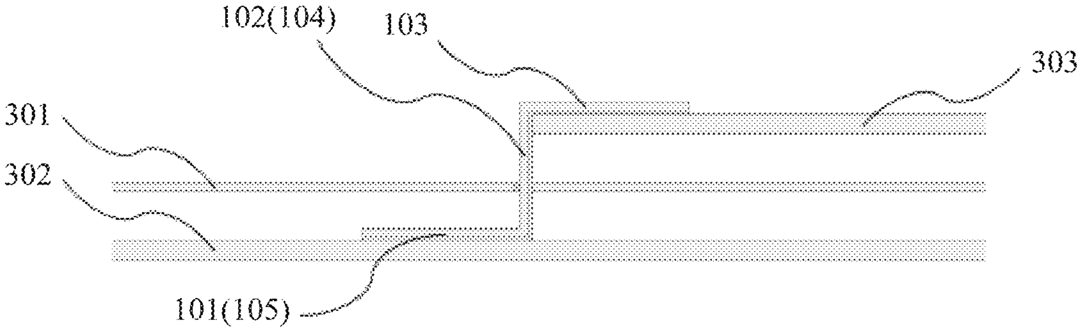
FIG. 5B is a side view of another transmission line connection structure according to an embodiment of this disclosure.

FIG. 5B is a side view of the transmission line connection structure shown in FIG. 5A. As shown in FIG. 5B, a conductor part of the first coupling section 101 and a conductor part of the fifth coupling section 105 are both coupled to the first ground layer 302, and a conductor part of the third coupling section 103 is coupled to the second ground layer 303. The second coupling section 102 is connected to the first coupling section 101 and the third coupling section 103, and the fourth coupling section 104 is connected to the fifth coupling section 105 and the third coupling section 103. In this way, the two coupling connection structures share the third coupling section 103 coupled to the second ground layer 303, so that a x-shaped structure is formed. This is more conducive to distribution of the coupling connection structure and improves integrity of the transmission line connection structure.

Figure 6A:
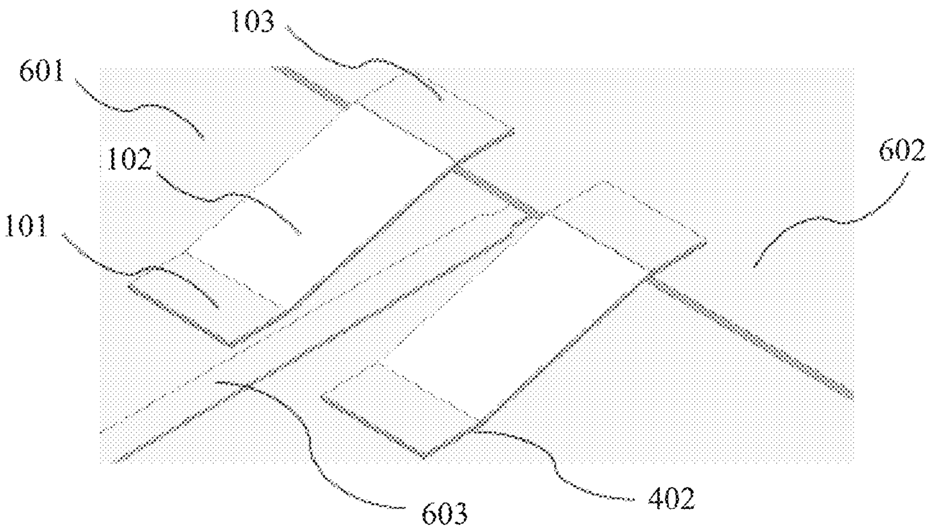
FIG. 6A is a diagram of a structure of another transmission line connection structure according to an embodiment of this disclosure.

(3) Based on the foregoing descriptions, in the coupling connection structures in embodiments shown in FIG. 4A and FIG. 5A, the second coupling section 102 is separately perpendicular to the first coupling section 101 and the third coupling section 103, to reduce the volume of the coupling connection structure. FIG. 6A is a diagram of a structure of another transmission line connection structure according to an embodiment of this disclosure. In FIG. 6A, a second coupling section 102 is not perpendicular to a first coupling section 101 and a third coupling section 103, and the second coupling section 102 is tilted relative to a ground layer 601.

Specifically, a coupling connection structure is bridged between the ground layer 601 and a ground layer 602. A part of a conductor strip 603 and the ground layer 601 form a microstrip structure, to form a first transmission line. The other part of the conductor strip 603 is located between the ground layer 601 and the ground layer 602, and forms a suspended strip structure with the ground layer 601 and the ground layer 602, to form a second transmission line. A part of the coupling connection structure is coupled to the ground layer 601, and another part is coupled to the ground layer 602. An insulation medium 402 exists between the coupling connection structure and each of the ground layer 601 and the ground layer 602.

Figure 6B:
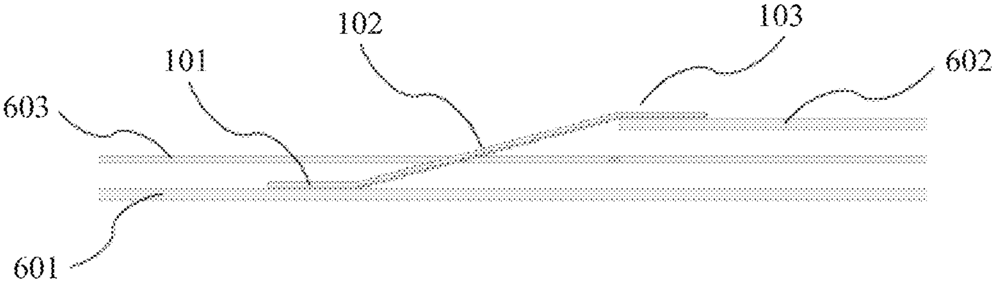
FIG. 6B is a side view of another transmission line connection structure according to an embodiment of this disclosure.

FIG. 6B is a side view of the transmission line connection structure shown in FIG. 6A. As shown in FIG. 6B, the coupling connection structure is divided into three parts, including the first coupling section 101, the second coupling section 102, and the third coupling section 103. A conductor part of the first coupling section 101 is coupled to the ground layer 601, a conductor part of the third coupling section 103 is coupled to the ground layer 602, and the second coupling section 102 is connected to the first coupling section 101 and the third coupling section 103. A plane on which the first coupling section 101 is located is parallel to a plane on which the third coupling section 103 is located, and an angle is formed between the second coupling section 102 and the ground layer 601. The angle between the second coupling section 102 and the ground layer 601 is a tilt angle of the coupling transition structure, namely, an angle between a projection of the second coupling section 102 on the ground layer 601 and the second coupling section 102.

It may be understood that, in the embodiment shown in FIG. 6A, the coupling connection structure is formed by combining two coupling connection structures 401 located on two sides of the conductor strip 603. For example, the conductor strip 603 may alternatively have one coupling connection structure on only one side, and a second coupling section 102 in the coupling connection structure is also tilted. This is not specifically limited.

In the embodiment shown in FIG. 6A, near a transfer location between an original microstrip and a suspended strip, after a coupling transition structure is added on one side or on each of two sides of the conductor strip 603, a loss caused by field discontinuity may be reduced, but impedance matching of the conductor strip 603 may be affected. To improve performance of the conductor strip 603, a location of the coupling connection structure may be adjusted, and the tilt angle of the coupling transition structure may be adjusted. For example, the tilt angle of the coupling transition structure decreases, so that a field change becomes smoother. This can further reduce the loss. In addition, impact on the impedance matching is also reduced, and a voltage standing wave ratio decreases constantly.

A structure of the second coupling section 102 in the coupling connection structure is changed, so that adjustment flexibility of the coupling connection structure can be improved. The tilt angle of the coupling connection structure is adjusted, so that the impedance matching can be improved, and the standing wave ratio decreases. In addition, the second coupling section 102 is tilted, so that the field change becomes smoother. This further reduces the loss, and improves signal transmission performance of the transmission line connection structure.

Figure 7A:
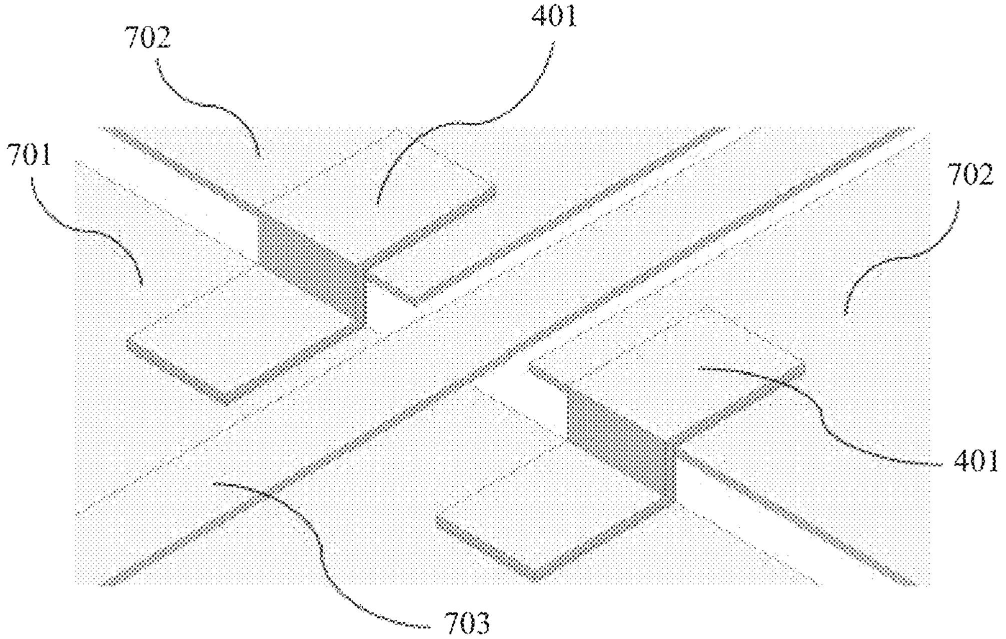
FIG. 7A is a diagram of a structure of another transmission line connection structure according to an embodiment of this disclosure.

(4) Based on an idea of the foregoing technical solutions, the coupling connection structure may alternatively be used at a transfer location between transmission lines in more forms. FIG. 7A is a diagram of a structure of another transmission line connection structure according to an embodiment of this disclosure. In FIG. 7A, a coupling connection structure is used at a transfer location between a microstrip (a first transmission line) and a coplanar waveguide strip (a second transmission line).

The coupling connection structure 401 is bridged between a ground layer 701 and a ground layer 702. A conductor strip 703 and the ground layer 702 are located on a same horizontal plane. A part of the conductor strip 703 and the ground layer 701 form a microstrip structure, to form the first transmission line. The other part of the conductor strip 703 is located between ground layers 702. In other words, the conductor strip 703 has a ground layer 702 on a left side and a ground layer 702 on a right side. The conductor strip 703 and the ground layer 702 form a coplanar waveguide strip structure, to form the second transmission line. A part of the coupling connection structure 401 is coupled to the ground layer 701, and another part is coupled to the ground layer 702. The coupling connection structure 401 may be located only on one side of the conductor strip 703, or may exist on each of two sides. An insulation medium 402 exists between the coupling connection structure 401 and each of the ground layer 701 and the ground layer 702.

Figure 7B:
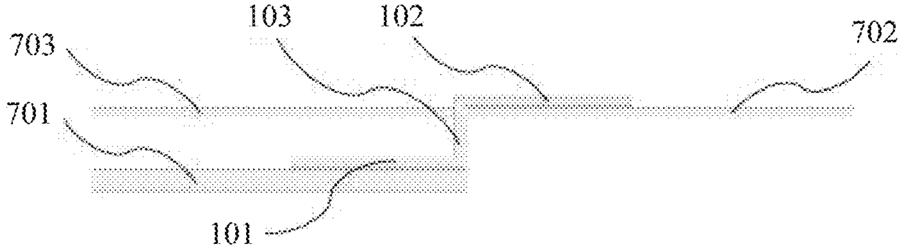
FIG. 7B is a side view of another transmission line connection structure according to an embodiment of this disclosure.

FIG. 7B is a side view of the transmission line connection structure shown in FIG. 7A. As shown in FIG. 7B, the coupling connection structure 401 is divided into three parts, including a first coupling section 101, a second coupling section 102, and a third coupling section 103. A conductor part of the first coupling section 101 is coupled to the ground layer 701, a conductor part of the third coupling section 103 is coupled to the ground layer 702, and the second coupling section 102 is connected to the first coupling section 101 and the third coupling section 103. For example, a plane on which the first coupling section 101 is located is parallel to a plane on which the third coupling section 103 is located, and a plane on which the second coupling section 102 is located may be perpendicular or tilted to the plane on which the first coupling section 101 is located on and the plane on which the third coupling section 103 is located, so that an angle is formed between a projection of the second coupling section 102 on the ground layer 701 and the second coupling section 102. It may be understood that, the plane on which the first coupling section 101 is located may not be absolutely parallel to the plane on which the third coupling section 103 is located, and a proper tilt angle also falls within the protection scope of this embodiment of this disclosure. This is not specifically limited.

In this embodiment, near the transfer location between the microstrip and the coplanar waveguide strip, a transition structure that is coupled to the ground layer 701 and the ground layer 702 is used on one side or each of two sides of the conductor strip 703, so that impact of field transfer discontinuity and impact of ground layer discontinuity are reduced, and a loss is greatly reduced. In addition, in a connection manner of the coupling connection structure 401, a location of the coupling connection structure 401 may be more flexibly adjusted, so that transmission line impedance matching is properly controlled. In addition, a passive intermodulation risk can be avoided by using the coupling connection structure. Therefore, the transmission line connection structure has better performance, and transmission efficiency is further improved when signal transmission is performed between different transmission lines.

Figure 8A:
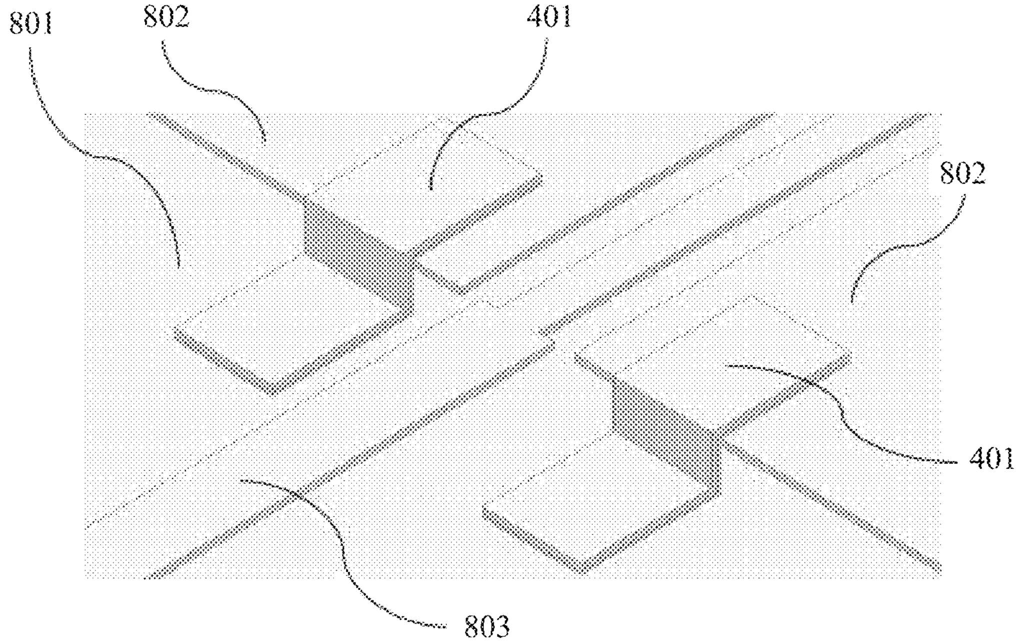
FIG. 8A is a diagram of a structure of another transmission line connection structure according to an embodiment of this disclosure.

(5) For example, the coupling connection structure may alternatively be used at a transfer location between transmission lines in more forms. FIG. 8A is a diagram of a structure of another transmission line connection structure according to an embodiment of this disclosure. In FIG. 8A, a coupling connection structure is used at a transfer location between a microstrip (a first transmission line) and a ground coplanar waveguide strip (a second transmission line).

The coupling connection structure 401 is bridged between a ground layer 801 and a ground layer 802. A conductor strip 803 and the ground layer 802 are located on a same horizontal plane. A part of the conductor strip 803 and the ground layer 801 form a microstrip structure, to form the first transmission line. The other part of the conductor strip 803 is located between ground layers 802. In other words, the conductor strip 803 has a ground layer 802 on a left side and a ground layer 802 on a right side. The conductor strip 803, the ground layer 801, and the ground layer 802 jointly form a ground coplanar waveguide strip structure, to form the second transmission line. A part of the coupling connection structure 401 is coupled to the ground layer 801, and another part is coupled to the ground layer 802. The coupling connection structure 401 may be located only on one side of the conductor strip 803, or may exist on each of two sides. An insulation medium 402 exists between the coupling connection structure 401 and each of the ground layer 801 and the ground layer 802.

Figure 8B:
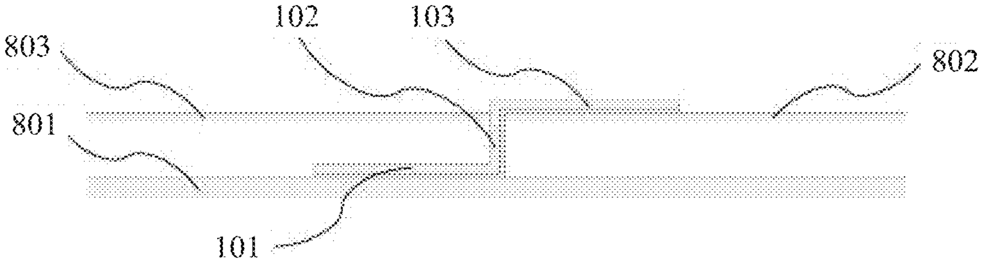
FIG. 8B is a side view of another transmission line connection structure according to an embodiment of this disclosure.

FIG. 8B is a side view of the transmission line connection structure shown in FIG. 8A. As shown in FIG. 8B, the coupling connection structure 401 is divided into three parts, including a first coupling section 101, a second coupling section 102, and a third coupling section 103. A conductor part of the first coupling section 101 is coupled to the ground layer 801, a conductor part of the third coupling section 103 is coupled to the ground layer 802, and the second coupling section 102 is connected to the first coupling section 101 and the third coupling section 103. A plane on which the first coupling section 101 is located is parallel to a plane on which the third coupling section 103 is located, and a plane on which the second coupling section 102 is located may be perpendicular or tilted to the plane on which the first coupling section 101 is located and the plane on which the third coupling section 103 is located, so that an acute angle is formed between a projection of the second coupling section 102 on the ground layer 801 and the second coupling section 102.

In this embodiment, near the transfer location between the microstrip and the ground coplanar waveguide strip, a transition structure that is coupled to the ground layer 801 and the ground layer 802 is used on one side or each of two sides of the conductor strip 803, so that impact of field transfer discontinuity and impact of ground layer discontinuity are reduced, and a loss is greatly reduced. In addition, in a connection manner of the coupling connection structure 401, a location of the coupling connection structure 401 may be more flexibly adjusted, so that transmission line impedance matching is properly controlled. In addition, a passive intermodulation risk can be avoided by using the coupling connection structure. Therefore, the transmission line connection structure has better performance, and transmission efficiency is further improved when signal transmission is performed between different transmission lines.

Figure 9A:
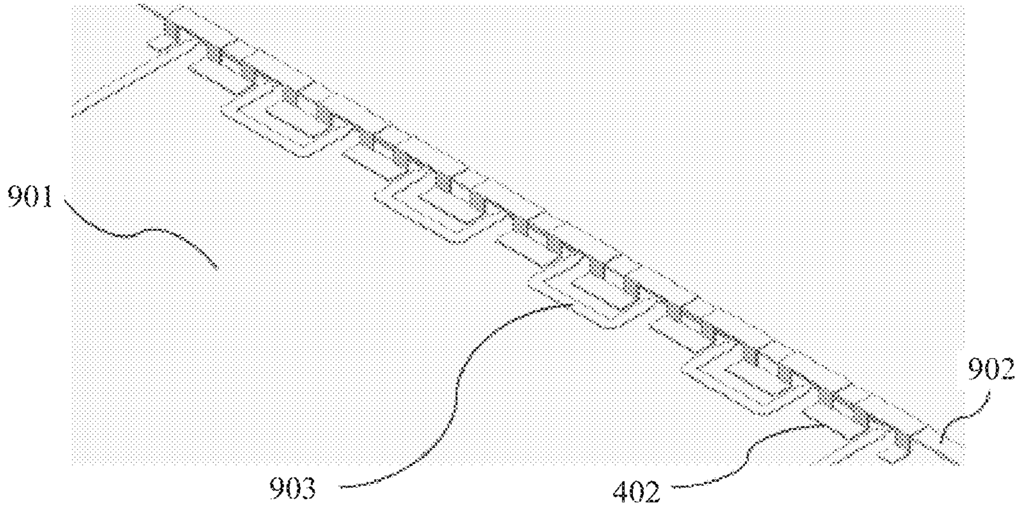
FIG. 9A is a diagram of a structure of another transmission line connection structure according to an embodiment of this disclosure.

(6) Based on the foregoing descriptions, embodiments of this disclosure further provide a multi-coupling connection structure, used for a transfer location of a multi-transfer structure including a microstrip and a suspended strip. FIG. 9A is a diagram of a structure of another transmission line connection structure according to an embodiment of this disclosure. In FIG. 9A, a multi-coupling connection structure is used at a plurality of transfer locations between a microstrip (a first transmission line) and a suspended strip (a second transmission line).

The multi-coupling connection structure is bridged between a ground layer 901 and a ground layer 902. A conductor strip enters and exits from the ground layer 902 for a plurality of times. A part of the conductor strip 903 and the ground layer 901 form a microstrip structure, to form the first transmission line. The other part is located between the ground layer 901 and the ground layer 902, and the conductor strip 903, the ground layer 901, and the ground layer 902 jointly form a suspended strip structure, to form the second transmission line. A part of the multi-coupling connection structure is coupled to the ground layer 901, and another part is coupled to the ground layer 902. In addition, the multi-coupling connection structure is bridged between a plurality of sections of the conductor strip 903. An insulation medium 402 exists between the multi-coupling connection structure and each of the ground layer 901 and the ground layer 902.

Figure 9B:
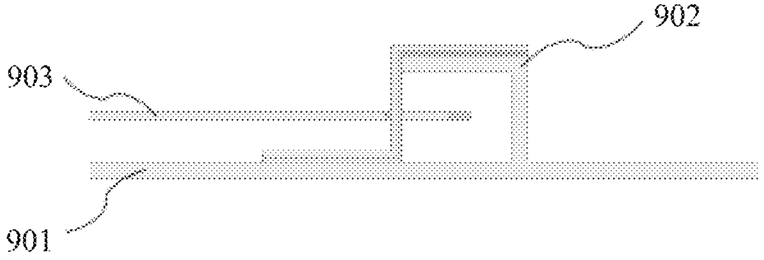
FIG. 9B is a side view of another transmission line connection structure according to an embodiment of this disclosure.

FIG. 9B is a side view of the transmission line connection structure shown in FIG. 9A. As shown in FIG. 9A, the multi-coupling connection structure is divided into a plurality of coupling sections, and there is a coupling connection structure on each of two sides of each section of the conductor strip 903. Coupling connection structures in two adjacent sections of the conductor strip 903 are used as an example. A multi-coupling connection structure may include four coupling connection structures. A first coupling connection structure is located on a first side of a first section of the conductor strip 903. A second coupling connection structure is located on a second side of the first section of the conductor strip 903. A third coupling connection structure is located on a first side of a second section of the conductor strip 903. A fourth coupling connection structure is located on a second side of the second section of the conductor strip 903. The first coupling connection structure and the second coupling connection structure share the coupling section coupled to the ground layer 902. The second coupling connection structure and the third coupling connection structure share the coupling section coupled to the ground layer 901. The third coupling connection structure and the fourth coupling connection structure share the coupling section coupled to the ground layer 901. A conductor part of a first coupling section is coupled to the ground layer 901, a conductor part of a third coupling section is coupled to the ground layer 902, and a second coupling section is connected to the first coupling section and the third coupling section. A plane on which the first coupling section is located is parallel to a plane on which the third coupling section is located, and a plane on which the second coupling section is located may be perpendicular or tilted to the plane on which the first coupling section is located and the plane on which the second coupling section is located, so that an acute angle is formed between a projection of the second coupling section on the ground layer 901 and the second coupling section.

Figure 10A:
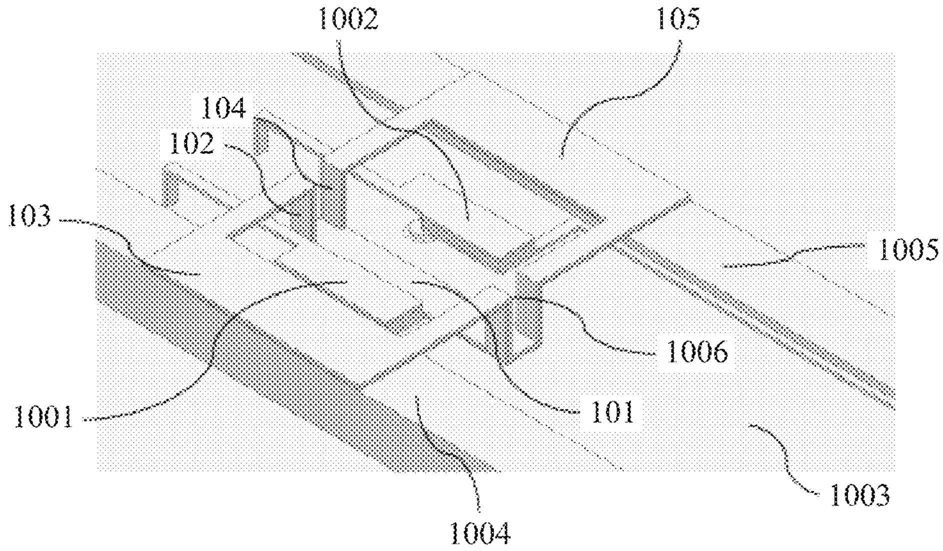
FIG. 10A is a diagram of a structure of another transmission line connection structure according to an embodiment of this disclosure.

(7) Based on the foregoing descriptions, embodiments of this disclosure further provide a transmission line connection structure. As shown in FIG. 10A, the connection structure includes two conductor strips: a conductor strip 1001 and a conductor strip 1002. A part of the conductor strip 1001 and a ground layer 1003 form a microstrip structure (a first transmission line), and the other part forms a suspended strip structure (a second transmission line) together with the ground layer 1003 and a ground layer 1004. Similarly, a part of the conductor strip 1002 and the ground layer 1003 form a microstrip structure (a third transmission line), and the other part forms a suspended strip structure (a fourth transmission line) together with the ground layer 1003 and a ground layer 1005.

In this case, a coupling connection structure 1006 is bridged between the ground layer 1003, the ground layer 1004, and the ground layer 1005. The coupling connection structure 1006 includes a first coupling section 101, a second coupling section 102, a third coupling section 103, a fourth coupling section 104, and a fifth coupling section 105. A conductor part of the first coupling section 101 is coupled to the ground layer 1003, a conductor part of the third coupling section 103 is coupled to the ground layer 1004, and the second coupling section 102 is connected to the first coupling section 101 and the third coupling section 103. A conductor part of the fifth coupling section 105 is coupled to the ground layer 1005, and the fourth coupling section 104 is connected to the first coupling section 101 and the fifth coupling section 105.

Figure 10B:
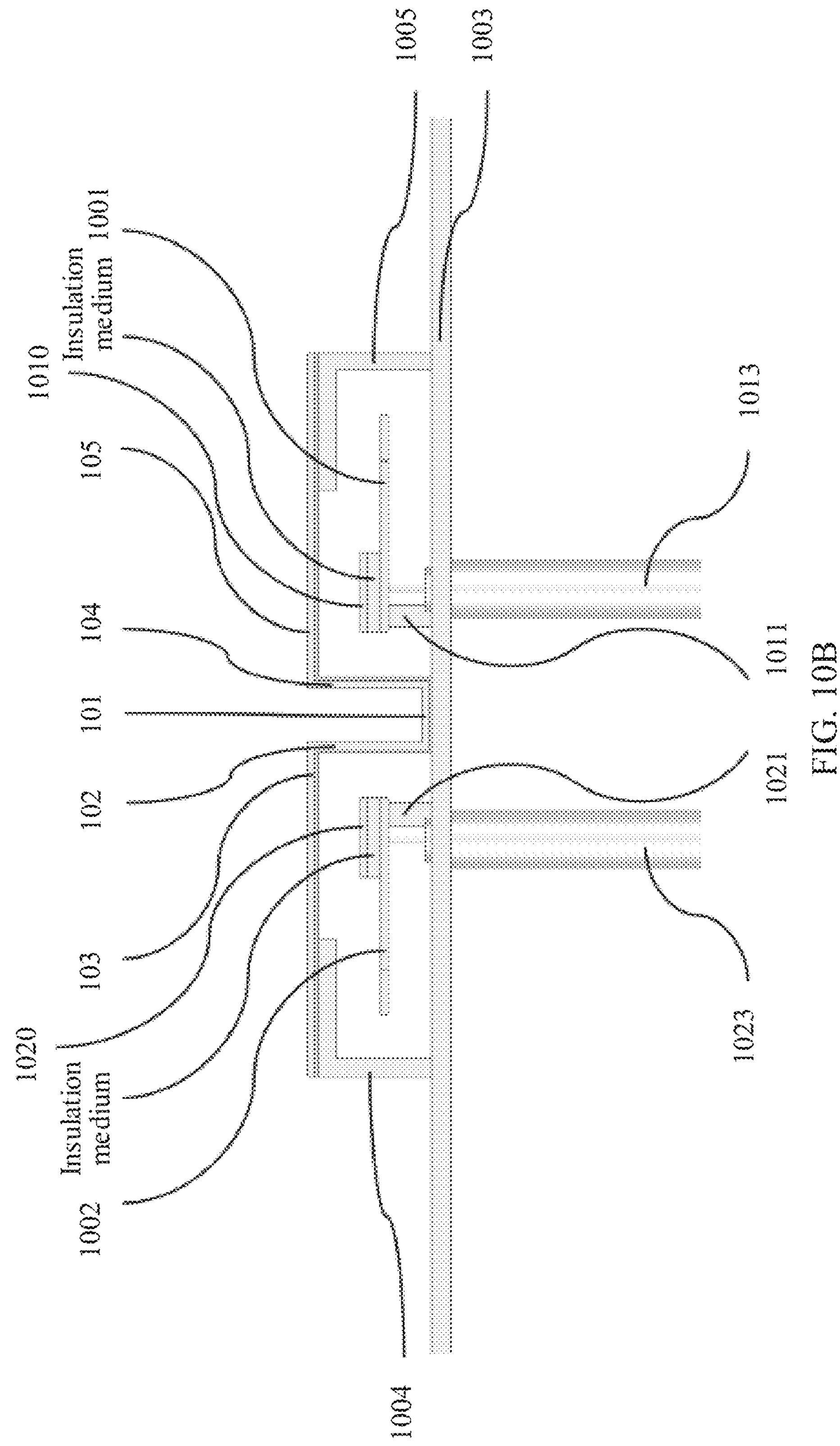
FIG. 10B is a side view of another transmission line connection structure according to an embodiment of this disclosure.

FIG. 10B is a side view of the transmission line connection structure shown in FIG. 10A. As shown in FIG. 10B, a transition structure that is coupled to the ground layer 1003, the ground layer 1004, and the ground layer 1005 is used near a transfer location that is of a double-line structure and that is between a microstrip and a suspended strip, to reduce a transfer loss and improve isolation between the two lines. A specific implementation of the solution is that a first feed conductor strip 1010, a first short-circuit conductor strip 1011, and a first feed coaxial cable 1013 form a first feed structure, and are coupled to the conductor strip 1001 by using an insulation medium. A second feed conductor strip 1020, a second short-circuit conductor strip 1021, and a second feed coaxial cable 1023 form a second feed structure, and are coupled to the conductor strip 1002 by using an insulation medium.

In this embodiment, the coupling connection structure is used, to reduce impact of field transfer discontinuity and ground layer discontinuity, and greatly reduce a loss. In addition, in a connection manner of the coupling connection structure, a location of the coupling connection structure may be more flexibly adjusted, so that transmission line impedance matching is properly controlled. In addition, a passive intermodulation risk can be avoided by using the coupling connection structure and the isolation between the two lines can be improved. Therefore, the transmission line connection structure has better performance, and transmission efficiency is further improved when signal transmission is performed between different transmission lines.

Equivalent forms (if exist) of a corresponding structure, material, action, and all apparatuses or steps and function elements in the appended claims are intended to include any structure, material, or action used to perform the function in connection with other expressly required elements. The descriptions of this disclosure are given for purposes of embodiments and description, but are not intended to be exhaustive or to be limited by the present disclosure to the disclosed forms.

What is claimed is:

1. A transmission line connection structure, comprising a first ground layer, a second ground layer, a conductor strip and a coupling connection structure, wherein the first ground layer and the second ground layer are discontinuous;

the first ground layer and a first part of the conductor strip form a first transmission line;

a second part of the conductor strip is disposed between the first ground layer and the second ground layer, wherein the first ground layer, the second ground layer and the second part of the conductor strip form a second transmission line; and the coupling connection structure comprises a first coupling connection structure and a second coupling connection structure, the first coupling connection structure is located on a first side of the conductor strip, and the second coupling connection structure is located on a second side of the conductor strip;

wherein the first coupling connection structure is coupled to the first ground layer and the second ground layer, and comprises a first coupling section (101), a second coupling section (102), and a third coupling section (103), wherein a first conductor part of the first coupling section (101) is coupled to the first ground layer, a second conductor part of the third coupling section (103) is coupled to the second ground layer, the second coupling section (102) is between the first coupling section (101) and the third coupling section (103); and wherein the second coupling connection structure is coupled to the first ground layer and the second ground layer, and comprises a fourth coupling section (104), a fifth coupling section (105), and the second coupling connection structure and the first coupling connection structure share the third coupling section (103), wherein a third conductor part of the third coupling section (103) is coupled to the second ground layer, a fourth conductor part of the fifth coupling section (105) is coupled to the first ground layer, the fourth coupling section (104) is between the coupling section (105) and the third coupling section (103).

2. The transmission line connection structure of claim 1, wherein the coupling connection structure further comprises an insulation medium part.

3. The transmission line connection structure of claim 2, wherein the insulation medium part is disposed between the first coupling section (101) and the first ground layer, and the insulation medium part is disposed between the third coupling section (103) and the second ground layer.

4. The transmission line connection structure of claim 1, wherein the first coupling section (101) is parallel to the third coupling section (103), and the second coupling section (102) is perpendicular to the first coupling section (101) and the third coupling section (103).

5. The transmission line connection structure of claim 1, wherein the first coupling section (101) is parallel to the third coupling section (103), and a tilt angle is formed between the second coupling section (102) and the first ground layer.

6. The transmission line connection structure of claim 1, wherein the second part of the conductor strip is disposed between the first ground layer and the second ground layer.

7. The transmission line connection structure of claim 1, wherein the transmission line connection structure comprises:

a plurality of first conductor strip sections disposed between the first ground layer and the second ground layer such that the first ground layer, the second ground layer and each first conductor strip section form a third transmission line;

one or more second conductor strip sections coupled to the first ground layer but not coupled to the second ground layer such that the first ground layer and each second conductor strip section form a fourth transmission line;

one of the plurality of first conductor strip sections has a first end appended to the second part of the conductor strip and a second end appended to a first end of one of the one or more second conductor sections;

a second end of the one of the one or more second conductor strip sections is appended to a first end of another first conductor strip section of the plurality of first conductor strip sections; and a third coupling connection structure, a fourth coupling connection structure, fifth coupling connection structure and a six coupling connection structure that each are coupled to the first ground layer and the second ground layer; wherein the third coupling connection structure and the second coupling connection structure share a coupling section coupled to the first ground layer, the third coupling connection structure and the fourth coupling connection structure share a coupling section coupled to the second ground layer, the fourth coupling connection structure and the fifth coupling connection structure share a coupling section coupled to the first ground layer, and the fifth coupling connection structure and the sixth coupling connection structure share a coupling section coupled to the second ground layer.

8. A transmission line connection structure, comprising a first ground layer, a second ground layer, a third ground layer, a first conductor strip, a second conductor strip, and a coupling connection structure, wherein the first ground layer and the second ground layer are discontinuous, and the first ground layer and the third ground layer are discontinuous;

the second ground layer and the third ground layer are disposed on a same side of the first ground layer, the first conductor strip is disposed between the first ground layer and the second ground layer, and the second conductor strip is disposed between the first ground layer and the third ground layer;

the first ground layer and a first part of the first conductor strip form a first transmission line;

the first ground layer, the second ground layer and a second part of the first conductor strip form a second transmission line that is a first suspended strip structure;

the first ground layer and at least third part of the second conductor strip form a third transmission line;

the first ground layer, the third ground layer and a fourth part of the second conductor strip form a fourth transmission line that is a first suspended strip structure;

the coupling connection structure is configured to be coupled to the first ground layer and the second ground layer, and be coupled to the first ground layer and the third ground layer; and the coupling connection structure comprises a first coupling section (101), a second coupling section (102), a third coupling section (103), a fourth coupling section (104), and a fifth coupling section (105), wherein a conductor part of the first coupling section (101) is coupled to the first ground layer, a conductor part of the third coupling section (103) is coupled to the second ground layer, and the second coupling section (102) is connected to the first coupling section (101) and the third coupling section (103); and a conductor part of the fifth coupling section (105) is coupled to the third ground layer, the fourth coupling section (104) is connected to the first coupling section (101) and the fifth coupling section (105).

9. The transmission line connection structure of claim 8, wherein the coupling connection structure further comprises an insulation medium part.

10. The transmission line connection structure of claim 9, wherein the insulation medium part is disposed between the first coupling section (101) and the first ground layer, the insulation medium part is disposed between the third coupling section (103) and the second ground layer, and the insulation medium part is disposed between the fifth coupling section (105) and the third ground layer.

* * * * *